(12) United States Patent
Shimizu

(10) Patent No.: US 7,808,862 B2
(45) Date of Patent: Oct. 5, 2010

(54) OPTICAL DISC DEVICE AND RECORDING METHOD

(75) Inventor: Tatsuro Shimizu, Yokohama (JP)

(73) Assignee: Toshiba Samsung Storage Technology Corporation, Kawasaki (JP)

( * ) Notice: Subject to any disclaimer, the term of this patent is extended or adjusted under 35 U.S.C. 154(b) by 721 days.

(21) Appl. No.: 11/528,538

(22) Filed: Sep. 28, 2006

(65) Prior Publication Data

US 2007/0076536 A1 Apr. 5, 2007

(30) Foreign Application Priority Data

Sep. 30, 2005 (JP) .............................. 2005-288695

(51) Int. Cl.
*G11B 21/08* (2006.01)

(52) U.S. Cl. .................................. 369/30.36

(58) Field of Classification Search ............. 369/30.36, 369/30.23, 53.12, 47.44, 53.42, 30.24
See application file for complete search history.

(56) References Cited

U.S. PATENT DOCUMENTS

| | | | | |
|---|---|---|---|---|
| 5,177,720 A | * | 1/1993 | Kondo | 369/30.04 |
| 5,745,474 A | * | 4/1998 | Owaki | 369/275.3 |
| 6,404,714 B1 | * | 6/2002 | Choi | 369/53.12 |
| 7,486,598 B2 | * | 2/2009 | Furukawa et al. | 369/47.1 |

FOREIGN PATENT DOCUMENTS

| | | |
|---|---|---|
| JP | 2001-110167 | 4/2001 |
| JP | 2001-266350 | 9/2001 |
| JP | 2003-317388 | 11/2003 |
| JP | 2005-196903 | 7/2005 |

* cited by examiner

*Primary Examiner*—Wayne R Young
*Assistant Examiner*—Aneeta Yodichkas
(74) *Attorney, Agent, or Firm*—Oblon, Spivak, McClelland, Maier & Neustadt, L.L.P.

(57) ABSTRACT

An optical disc device includes a recording section which records recording information in an optical disk, a reproducing section to reproduce the information recorded in the optical disk, a storage section which stores information $Po-n$ to $Po+n$ or $Pb-n$ to $Pb+n$ of a preceding or succeeding position $Po\pm n$ or $Pb\pm n$ while a recording start position Po or a recording interrupt position Pb is defined as a reference, the information being reproduced by the reproducing section, when recording of the recording information is started or recording is restarted after the recording has been interrupted, and processing section which comparing reproduction information obtained by reproducing the information $Po-n$ to $Po+n$ or $Pb-n$ to $Pb+n$ again, cache information stored in the storage section, and the recording information, and then, determining whether or not recording has been normally performed on the optical disk when recording of the recording information terminates or is interrupted.

14 Claims, 7 Drawing Sheets

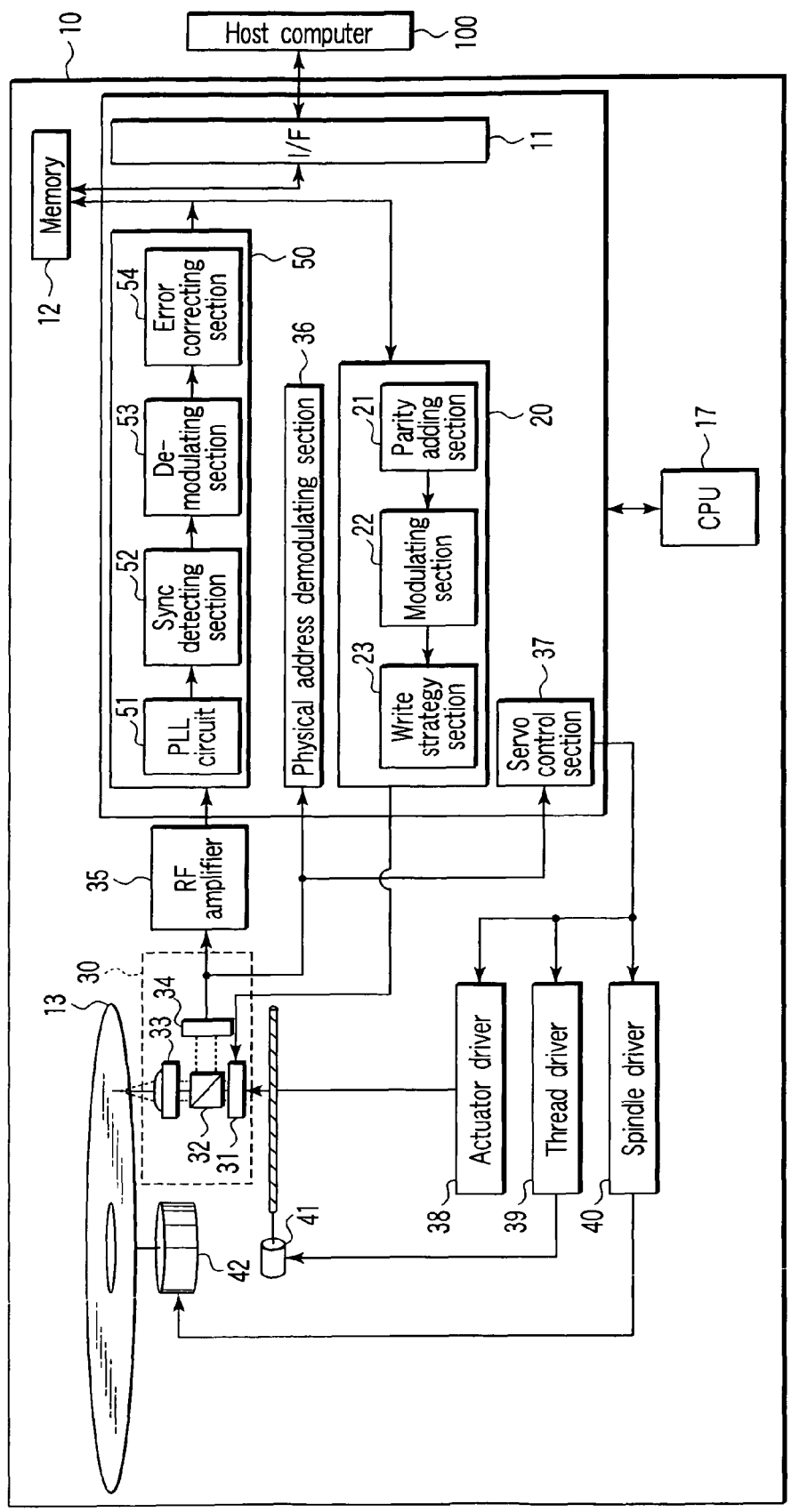
F I G. 1

OPTICAL DISC DEVICE AND RECORDING METHOD

CROSS-REFERENCE TO RELATED APPLICATIONS

This application is based upon and claims the benefit of priority from prior Japanese Patent Application No. 2005-288695, filed Sep. 30, 2005, the entire contents of which are incorporated herein by reference.

BACKGROUND OF THE INVENTION

1. Field of the Invention

The present invention relates to a technique of writing information to be recorded in an optical disc. In particular, the present invention relates to an optical disc device and a recording method for checking information recorded in an optical disc.

2. Description of the Related Art

There is a technique of checking whether or not information has been normally written in an optical disc when the information is recorded in the optical disc (Jpn. Pat. Appln. KOKAI Publication No. 2001-266350).

In this technique, a check is made by reproducing a continuous writing start position and judging whether or not synchronization is off before and after the continuous writing start position and whether or not an error correcting process has been successfully carried out.

In the above described technique, it is impossible to check whether or not writing has been normally carried out merely by judging whether or not synchronization is off and whether or not an error correcting process has been successfully carried out.

BRIEF SUMMARY OF THE INVENTION

According to one aspect of the present invention, there is provided an optical disc device comprising a recording section which records recording information in an optical disk; a reproducing section to reproduce the information recorded in the optical disk; a storage section which stores information Po−n to Po+n or Pb−n to Pb+n of a preceding or succeeding position Po±n or Pb±while a recording start position Po or a recording interrupt position Pb is defined as a reference, the information being reproduced by the reproducing section, when recording of the recording information is started or recording is restarted after the recording has been interrupted; and processing section which comparing reproduction information obtained by reproducing the information Po−n to Po+n or Pb−n to Pb+n again, cache information stored in the storage section, and the recording information, and then, determining whether or not recording has been normally performed on the optical disk when recording of the recording information terminates or is interrupted.

BRIEF DESCRIPTION OF THE SEVERAL VIEWS OF THE DRAWING

FIG. 1 is a view showing a configuration of an optical disc drive unit according to an embodiment of the present invention;

DETAILED DESCRIPTION OF THE INVENTION

Figure 2:
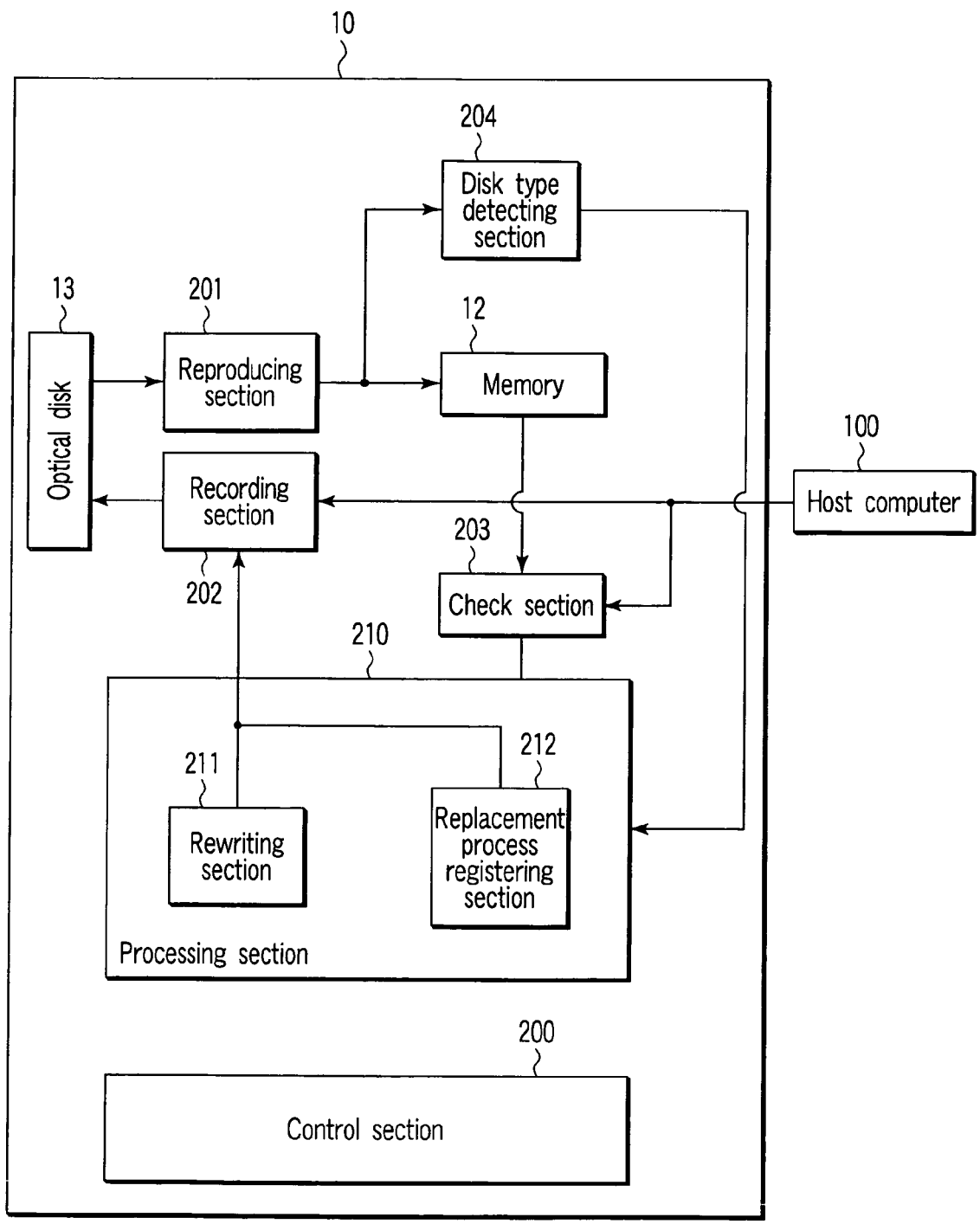
FIG. 2 is a block diagram depicting a system for making a check according to an embodiment of the present invention.

Hereinafter, preferred embodiments of the present invention will be described with reference to the accompanying drawings.

FIG. 1 is a view showing a configuration of an optical disc drive unit according to an embodiment of the present invention.

In an optical disc device 10, during a recording mode, data D1 sequentially assigned from a host computer 100 is sequentially stored in a buffer memory 12 via an interface section 11.

The data D1 stored in the buffer memory 12 is sequentially supplied to an encoder section 20 in units of sectors (2 Kbytes). The encoder section 20 is composed of: a parity adding section 21; a modulating section 22; and a write strategy section 23. The parity adding section 21 adds an error correction code and sync data to the data D1, and supplies the added data to the modulating section. The modulating section 22 applies a predetermined modulating process to the data D1 in accordance with an optical disc format, and supplies the modulated data to the write strategy section 23. The write strategy section 23 generates a recording pulse suitable for recording from the modulated the data D1, and supplies the generated pulse to a laser diode 31.

The laser diode 31 emits a light beam according to the recording pulse. The light beam is irradiated onto a recording face of an optical disc 13 via a beam splitter 32 and an objective lens 33.

When the light beam is irradiated, reflection light from the optical disc 13 is incident to an photo-detector 34 via the objective lens 33 and the beam splitter 32. The photo-detector 34 converts an optical signal to an electrical signal.

The photo-detector 34 generates: servo error signals such as a tracking error signal and a focus error signal; a wobble signal; and an RF signal based on the reflection light from the optical disc 13. The. servo error signals are supplied to a servo control section 37, and the wobble signal is supplied to a physical address demodulating section 36. In addition, the RF signal is supplied to a decoder section 50 via an RF amplifier 35.

The servo control section 37 rotationally drives the optical disc 13 at a predetermined speed by controlling a spindle motor 42 via a spindle driver 40 based on the supplied servo error signal. In addition, the servo control section 37 moves a beam spot of a light beam on the optical disc 13 (hereinafter, simply referred to as a beam spot) in a radial direction of the optical disc 13 along a data track (pre-groove or land) formed on the recording face of the optical disc 13 by controlling a thread motor 41 via a thread driver 39 based on the servo error signal. Further, the servo control section 37 makes tracking control and focus control by controlling an focus actuator and servo actuator via an actuator driver 38 based on the servo error signal.

On the other hand, the physical address demodulating section 36 detects an absolute address of the beam spot in the optical disc 13 at that time and sends out the detected address to a central processing unit (CPU) 17 by decoding the wobble signal.

That is, the physical address demodulating section 36 passes the wobble signal through a band path filter circuit in the range of ±1 [Hz] in which a center frequency provided inside of the signal is defined as 22.05 [Hz], thereby sampling a wobble component included in the wobble signal. In addition, this demodulating section detects an absolute address on the optical disc 13 at which the beam spot is positioned, and then, sends out the detected address as an address information signal to the CPU 17 by applying an FM demodulating process to the wobble component.

In addition, every time the absolute address on the optical disc 13 obtained by the decoding process as described above changes (that is, every time a sector scanned by a beam spot in the optical disc 13 changes), the physical address demodulating section 36 sends out a sync interrupt signal which notifies such a change to the CPU 17.

Thus, the CPU 17 sequentially recognizes the recording position in the optical disc 13 based on these address information signal and sync interrupt signal assigned from the physical address demodulating section 36, and then, executes a required control process so as to enable the data D1 to be correctly recorded in the optical disc 13 based on the result of the recognition.

In contrast, during a reproducing mode, the CPU 17 rotationally drives the optical disc 13 at a predetermined speed as in the above described recording mode, by controlling the servo control section 37. In addition, this CPU moves an optical pickup 30 along a data track of the optical disc 13 and makes tracking control and focus control.

In addition, the CPU 17 emits a light beam to the optical disc 13 by driving the above described laser diode 31. As a result, this light beam is reflected on the recording face of the optical disc 13, and readout data (RF signal) read out from the optical disc 13 obtained based on the reflected light is supplied from the photo-detector 34 to a decoder section 50 via the RF amplifier 35.

The decoder section 50 is composed of: a phase locked loop (PLL) circuit 51; a sync detecting section 52; a demodulating section 53; and an error correcting section 54. The PLL circuit 51 samples a clock CLK from the readout data and supplies the sampled clock CLK to the sync detecting section 52 together with the readout data.

The sync detecting section 52 generates a sync data detecting window pulse $P_{WIN}$ with a pulse width which is greater by predetermined bits before and after a data pattern of sync data $D_{SYNC}$, based on the supplied clock CLK. Then, the sync detecting section 52 sequentially detects sync data $D_{SYNC}$ from readout data D2 by utilizing the sync data detecting window pulse $P_{WIN}$ and sequentially sends out the readout data D2 to the demodulating section 53 in predetermined units based on the detection result.

Then, the readout data D2 is demodulated at the demodulating section 53, and the demodulated data is supplied to the error correcting section 54. An error correcting process is applied at the error correcting section 54, whereby the data is converted to original format data before recorded, and then, the converted data is sent out to the host computer 100 via the buffer memory 12 and the interface section 11.

In this way, this optical disc device 10 is designed so that the data D1 assigned from the host computer 100 can be recorded in the optical disc 13 and so that the data recorded in the optical disc 13 can be reproduced and sent the readout data D2 to the host computer 100.

In addition, in the optical disc device 10, an amount of data stored in the buffer memory 12 is supplied to the CPU 17 as a storage data quantity information signal; and a signal level of a tracking error signal is assigned as an off-track quantity information signal, supplied from the servo control section 37 to the CPU 17. In this manner, the CPU 17 can detect an occurrence of a buffer under-run based on these storage data quantity information signal and off-track quantity information signal or an occurrence of off-track of a beam spot caused by shock or the like.

Then, when the CPU 17 detects that a buffer under-run or a beam spot off-track has occurred based on the storage data quantity information signal and off-track quantity information signal during an operation for writing data into the optical disc 13, the CPU 17 controls the encoder section 20 or the like to temporarily interrupt the operation for writing data into the optical disc 13.

In addition, in the CPU 17, based on the storage data quantity information signal and off-track quantity information signal, a predetermined amount of the data D1 is then stored in the buffer memory 12 in the case of the buffer under-run. In the case of the beam spot off-track, the beam spot is returned to a position set immediately before a writing operation is interrupted. In this manner, when it is checked that the problem has been solved, the encoder section 20 or the like is controlled to restart the writing operation of the data D1 (to continuously write the data). Then, the CPU 17 stores in the buffer memory 12 an address of a continuous writing start position based on the address information signal assigned from the physical address demodulating section 36.

Next, in the case of the optical disc device 10, when recording terminates during a recording mode or when continuous writing is carried out after recording has been interrupted due to a buffer under-run or a shock, it is checked whether or not data D1 has been normally written before and after the recording start position or interrupt position. Then, only when it is judged that data D1 has been normally written, the end of writing data D1 is notified to the host computer 100.

First, a system for making a check will be described with reference to FIG. 2.

A recording section 202 records the data D1 sent from the host computer 100 in the optical disc 13. A reproducing section 201 reproduces the readout data D2 written into the optical disc 13. The readout data D2 reproduced by the reproducing section 201 can be stored in the buffer memory 12. In addition, from the readout data D2 reproduced by the reproducing section 201, a disc type detecting section 204 detects type of the optical disc 13, i.e., whether or not the disc type is a rewritable type or a write-once type.

A check section 203 checks whether or not the data D1 has been normally written into the optical disc 13 by comparing the readout data D2 stored in the buffer memory 12 with the data written into the host computer 100. A processing section 210 carries out a predetermined process according to a result of check by the check section 203. A rewriting section 211 instructs the recording section 202 to record the recording data again. A replacement process registering section 212 registers a replacement process in the recording section 202.

A control section 200 makes control of the reproducing section 201, the recording section 202, the check section 203, and the disc type detecting section 204.

Figure 3:
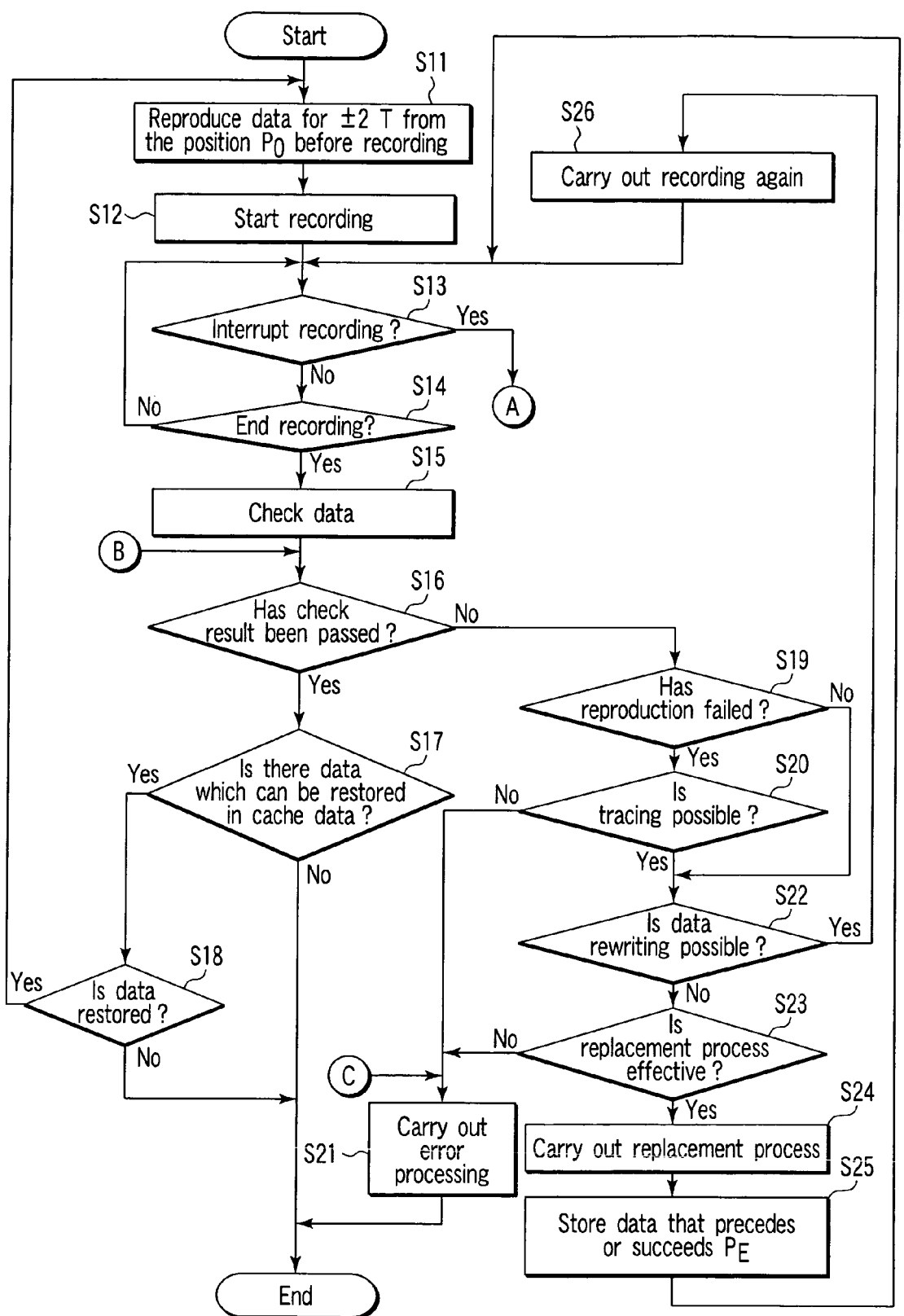
FIG. 3 is a flow chart showing operating procedures for checking whether or not recording data has been normally written into the optical disc.
Figure 4:
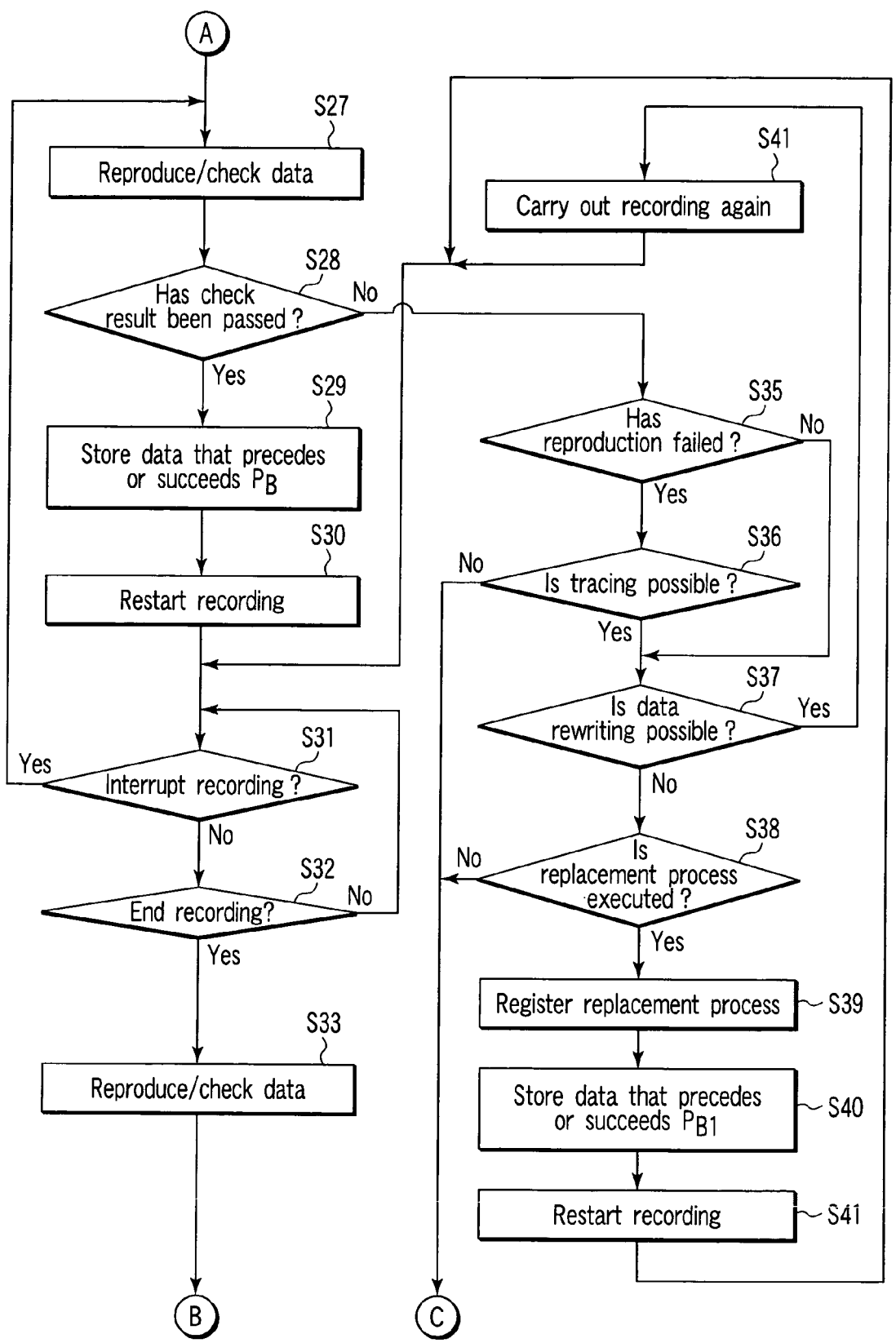
FIG. 4 is a flow chart showing operating procedures for checking whether or not recording data has been normally written into the optical disc.

A flow of a processing operation for checking whether or not data has been normally written will be described with reference to FIGS. 3 and 4.

First, data is read from the optical disc 13 by the reproducing section 201, and the readout data D2b is stored in the buffer memory 12 (step S11). The readout data D2b is read in an area ranging from −2T (track) to +2T while a writing start position $P_0$ is defined as a reference.

The data D1 recording in the optical disc 13 is started by the recording section 202 (step S12). Next, the control section 200 judges whether or not a buffer under-run or a beam spot off-track has occurred, and then, a recording interrupt has occurred, based on: a storage data quantity information signal indicating an amount of storage data in the buffer memory 12, and an off-track quantity information signal indicating an amount of off-track of a beam spot in the optical disc 13, the off-track being assigned from the servo control section 37 (step S13). In the case where recording interrupt has not occurred, this control section 37 judges whether or not a write operation of all the data D1 assigned from the host computer 100 has terminated (step S14).

In the case where recording has terminated (Yes in step S14), the check section 203 makes a check between data D2$b$ stored in the buffer memory 12 before carrying out recording in step S11 (data D2$b$ reproduced before recorded) and data D1 sent from the host computer 100 (data D1 used for recording); and data D2 reproduced after recorded (step S15).

Figure 5:
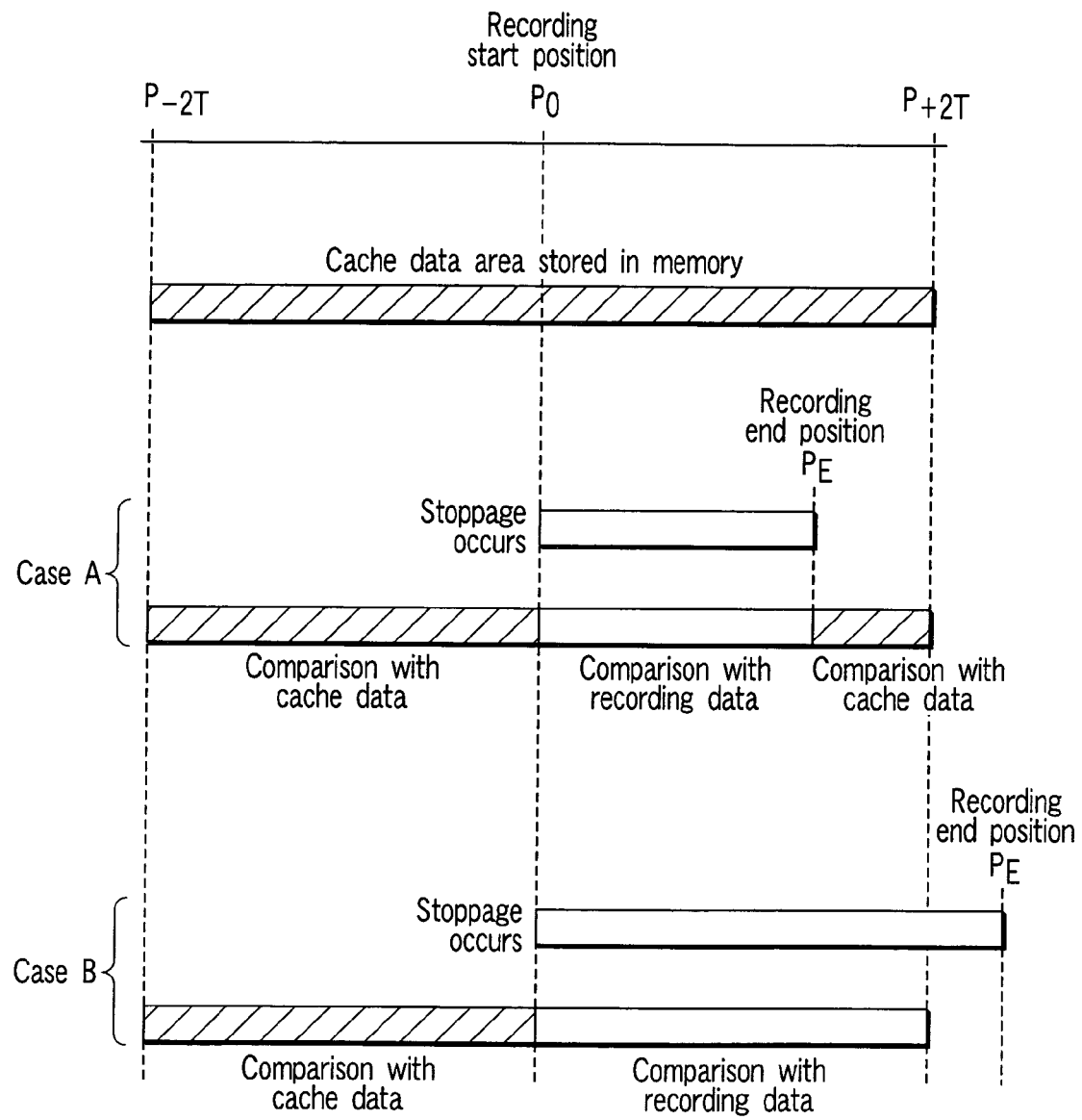
FIG. 5 is a view adopted to explain check of data written into the optical disc.

Here, the data D2 check will be described with reference to Table 1 and FIG. 5.

TABLE 1

| Recording end position on optical disc | | −$P_{+2T}$ | | | $P_{+2T}$ | |
|---|---|---|---|---|---|---|
| Position on optical disc | $P_{-2T}$ − $P_0$ | $P_0$ − $P_E$ | $P_E$ − $P_{+2T}$ | $P_{-2T}$ − $P_0$ | $P_0$ − $P_{+2T}$ | |
| Comparison target | Cache data | Recording data | Cache data | Cache data | Recording data | |

A description will be given with respect to a case in which a recording end position $P_E$ on the optical disc 13 is identical to or precedes a position $P_{+2T}$ (Case A in FIG. 5). Reproduced data D2-2T0 between a position $P_{-2T}$ and the position $P_0$ on the optical disc 13 (data D2-2T0 reproduced after recorded) is compared with cache data D2$b$-2T0 stored in the buffer memory 12 (data D2$b$-2T0 reproduced before recorded). Reproduced data D2-0E between the position $P_0$ and the position $P_E$ on the optical disc 13 (data D2-0E reproduced after recorded) is compared with recording data D1 sent from the host computer 100 (data D1 used for recording). Reproduced data d2-E2t between the position $P_E$ and a position $P_{+2T}$ on the optical disc 13 (data D2-E2T reproduced after recorded) is compared with the cache data D2$b$-E2T stored in the buffer memory 12 (data D2$b$-E2T reproduced before recorded).

Now, a description will be given with respect to a case in which the recording end position $P_E$ on an optical disc is identical to or succeeds the position $P_{+2T}$ (Case B in FIG. 5). In the same manner as that described above, reproduced data D2-2T0 between the position $P_{-2T}$ and the position $P_0$ on the optical disc 13 is compared with the cache data D2$b$-2T0 stored in the buffer memory 12. Reproduced data D2-02T between the position $P_0$ and the position $P_{+2T}$ on the optical disc 13 is compared with recording data D1 sent from the host computer 100 to be recorded in the optical disc 13.

By comparing the data in this way, it is checked whether or not the recording data D1 has been normally recorded and whether or not the data has been recorded at a correct position (for example, whether or not a portion in front of the recording start position $P_0$ has not been overwritten).

After data check of the above processing operation has been made, the processing section 210 judges whether or not check by the check section 203 has been passed (step S16). In the case where the check has been passed (Yes in step S16), it is judged that the data erased by being overwritten by recording data can be restored by using the cache data D2$b$ stored in the buffer memory 12 before starting recording (step S17). In the case where no data can be restored (No in step S17), the recording process is terminated.

In the case where there exists data which can be restored (Yes in step S17), the processing section 210 queries the host computer 100 as to whether or not the data is restored. The processing section 210 judges whether or not the data is restored in accordance with a response from the host computer 100 (step S18). In the case where the data is restored (Yes in step S18), the processing section 210 reverts to step S11 in which the data stored in the buffer memory 12 is newly written into the optical disc 13 by the recording section 202, thereby restoring the data. In the case where the data is not restored (No in step S18), the recording process is terminated.

Here, the case of restoring the data includes a case in which a user makes a request for canceling recording and reverting to an original state.

In step S16, in the case where the check has not been passed (No in step S16), the processing section 210 judges whether or not reproduction has failed (step S19). In the case where the reproduction has failed (Yes in step S19), the processing section 210 judges whether or not a reason why reproduction has failed is that a track has not been successfully traced (step S20). In the case where it is judged that the track has not been successfully traced (No in step S20), error processing is carried out (step S21), and the recording process is terminated.

In the case where it is judged that the reproduction has not failed in step S19 (No in step S19) and in the case where it is judged that the track has been successfully traced in step S20 (Yes in step S20), the disc type detecting section 204 judges whether or not the optical disc 13 is a data rewritable type (step S22). In the case where the optical disc 13 is a rewritable type (Yes in step S22), the rewriting section 211 causes the recording section 202 to carry out recording from the position $P_{-2T}$ or the position $P_0$ again according to the check result of step S16, namely, according to at what position recording data has not been normally recorded (step S26). In the case where the optical disc 13 is not a rewritable type, the processing section 210 judges whether or not the replacement process is set to be carried out (step S23).

In the case where the judgment result is negative (No in step S23), error processing is carried out (step S21), and the recording process is terminated. In the case where the judgment result is affirmative (Yes in step S23), the processing section 210 stores data for ±2T in the buffer memory 12 while a recording end position $P_E$ is defined as a reference (step S24), and registers a replacement process in the replacement process registering section 212. The replacement process registering section 212 starts a replacement process from a next portion of the record8ing end position $P_E$ (step S25), and the control section 200 monitors an interrupt of recording and the end of recording (step S13 and step S14). A processing operation carried out after replacing data has been recorded are identical to a case in which normal recording has terminated. A duplicate description is omitted here.

In step S13, in the case where it is judged that a recording interrupt has occurred (Yes in step S13), the reproducing section 201 reproduces information recorded in the optical disc 13 from the position $P_{-2T}$ on the optical disc 13 corresponding to a first portion of the cache data D2$b$ stored on the buffer memory 12 to the position $P_{+2T}$ on the optical disc 13 corresponding to a last portion of the cache data D2b. The check section 203 checks whether or not the data D1 has been normally recorded in the optical disc 13 by comparing the reproducing data D2 contained in the optical disc 13 with the cache data D2b stored on the buffer memory 12 and the recording data D1 in the host computer 100 in the same manner as that described above (step S27).

Figure 6:
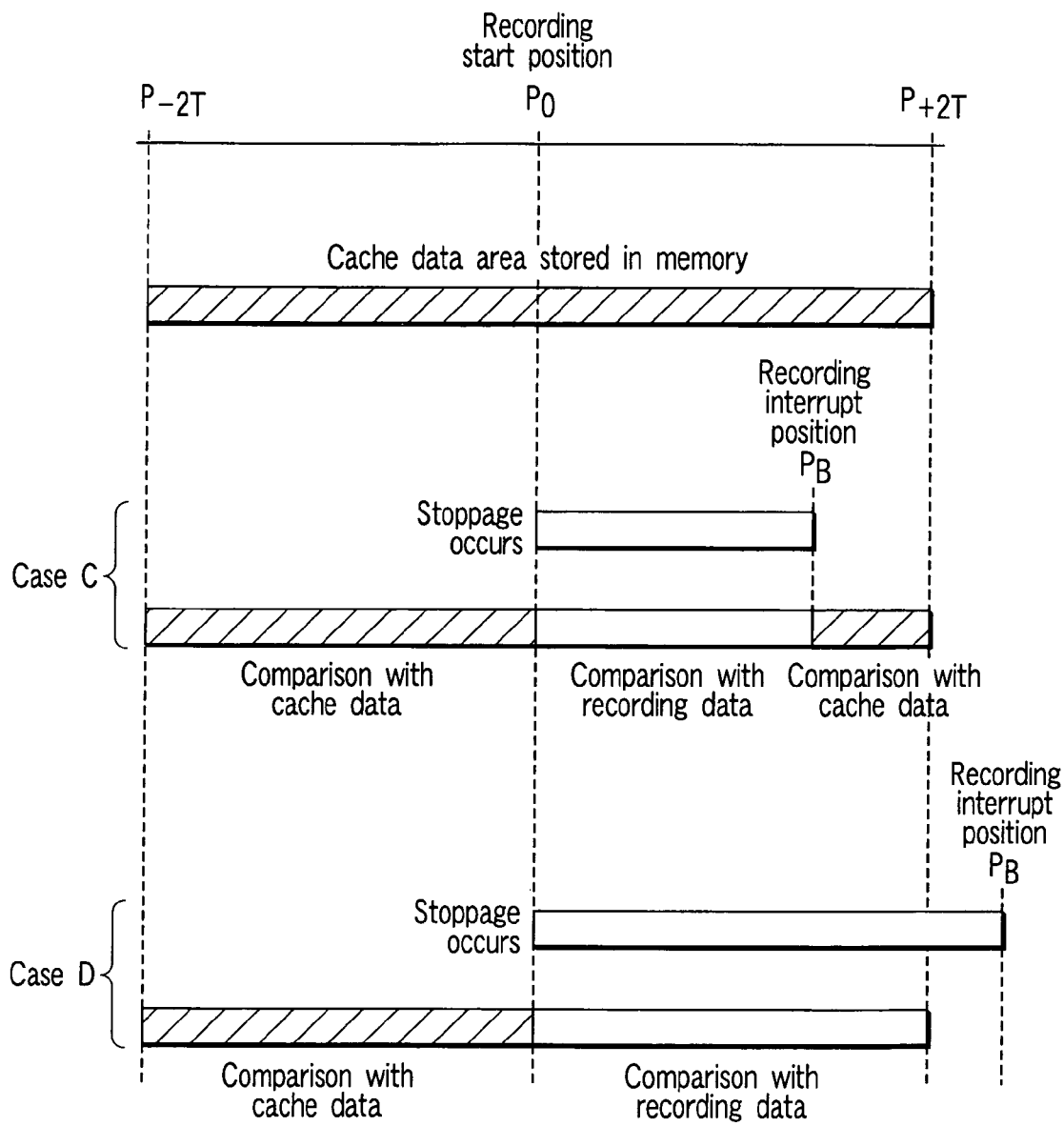
FIG. 6 is a view adopted to explain check of data written into the optical disc.

Now, the data D2 check will be described with reference to Table 2 and FIG. 6. A check is made in accordance with a rule shown in Table 2 according to an interrupt position $P_B$ on the optical disc 13.

TABLE 2

| Recording interrupt position on optical disc | $-P_{+2T}$ | | | $P_{+2T}-$ | |
|---|---|---|---|---|---|
| | $P_{-2T} - P_0$ | $P_0 - P_B$ | $P_B - P_{+2T}$ | $P_{-2T} - P_0$ | $P_0 - P_{+2T}$ |
| Position on optical disc | $P_{-2T} - P_0$ | $P_0 - P_B$ | $P_B - P_{+2T}$ | $P_{-2T} - P_0$ | $P_0 - P_{+2T}$ |
| Comparison target | Cache data | Recording data | Cache data | Cache data | Recording data |

A description will be given with respect to a case in which a recording interrupt position $P_B$ on the optical disc 13 is identical to or precedes the position $P_{+2T}$ (Case C in FIG. 6). Reproduced data D2-2T0 between the position $P_{-2T}$ and the position $P_0$ on the optical disc 13 is compared with the cache data D2b-2T0 stored in the buffer memory 12. Reproduced data D2-0B between the position $P_0$ and the position $P_B$ on the optical disc 13 is compared with the recording data D1 sent from the host computer 100. A reproduced data D2-B2T between the position $P_B$ and the position $P_{+2T}$ on the optical disc 13 is compared with the cache data D2b-B2T stored in the buffer memory 12.

Now, a description will be given with respect to a case in which the recording interrupt position $P_B$ on the optical disc 13 is identical to or succeeds the position $P_{+2T}$ (Case D in FIG. 6). Reproduced data D2-2T0 between the position $P_{-2T}$ and the position $P_0$ on the optical disc 13 is compared with the cache data D2b-2T0 stored in the buffer memory 12. Reproduced data D2-02T between the position $P_0$ and the position $P_{+2T}$ on the optical disc 13 is compared with the recording data D1 sent from the host computer 100 to be recorded in the optical disc 13 (step S28).

In the case where the check has been passed (Yes in step S28), the control section 200 causes the reproducing section 201 to reproduce data for ±2 tracks from the interrupt position $P_B$ on the optical disc 13, and stores the reproduced data D2 in the buffer memory 12 (step S29). Then, the control section 200 causes the recording section 202 to restart writing of recording data from the interrupt position $P_B$ (step S30).

The control section 200 judges whether or not a buffer under-run or a beam spot off-track has occurred (step S31). In the case where recording interrupt has not occurred, this control section 200 judges whether or not an operation for writing all data D1 assigned from the host computer 100 has terminated (step S32).

A processing operation carried out after recording has terminated after interrupting/restarting data recording is identical to a case in which normal recording has terminated. A duplicate description is omitted here. In the case where the recording has terminated (Yes in step S32), information recorded in the optical disc 13 is reproduced from the position $P_{-2T}$ on the optical disc 13 corresponding to a first portion of the cache data D2b stored on the buffer memory 12 to the position $P_{+2T}$ on the optical disc 13 corresponding to a last portion of the cache data D2b. Then, the reproduced data D2 contained in the optical disc 13 is compared with the cache data D2b and recording data D1, and it is checked whether or not the data D1 has been normally recorded in the optical disc 13 (step S33). After the check, processing goes to step S16. Processing operations in and after step S16 has been described previously. A duplicate description is omitted here.

In step S31, in the case where it is judged that a recording interrupt has occurred a position $P_B$ (Yes in step S31), the reproducing section 201 reproduces information recorded in the optical disc 13 from a position $P_{B-2T}$ on the optical disc 13 corresponding to a first portion of the cache data D2b stored on the buffer memory 12 to a position $P_{B+2T}$ on the optical disc 13 corresponding to a last portion of the cache data D2b. Then, the check section 203 checks whether or not data D1 has been normally recorded in the optical disc 13 by comparing the reproduced data D2 contained in the optical disc 13 with the cache data D2b and recording data D1 (step S27).

Figure 7:
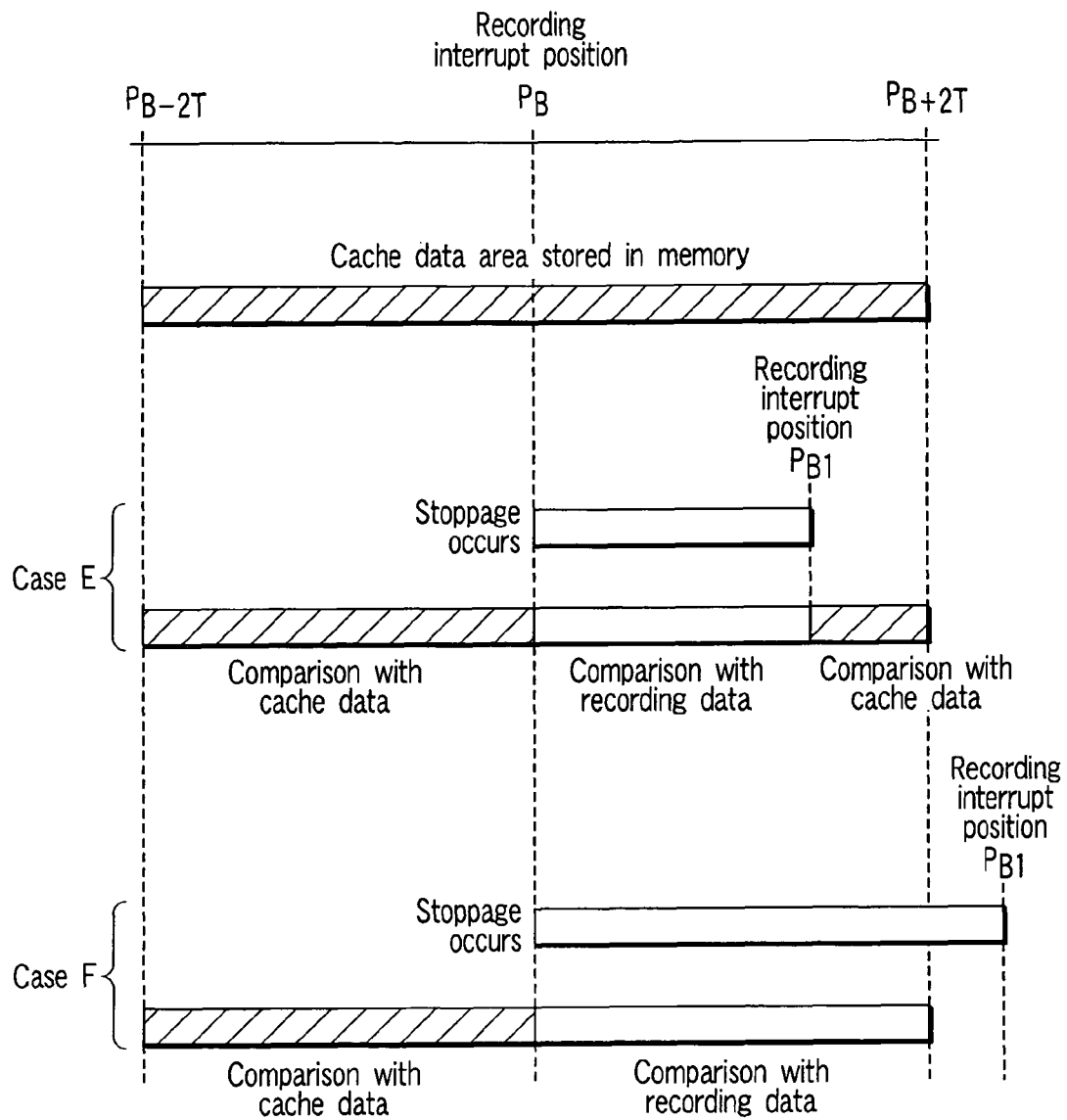
FIG. 7 is a view adopted to explain check of data written into the optical disc.

Now, the data D2 check will be described with reference to Table 3 and FIG. 7. A check is made in accordance with a rule shown in Table 3 according to an interrupt position on the optical disc 13.

TABLE 3

| Recording interrupt position on optical disc | $-P_{B+2T}$ | | | $P_{B+2T}-$ | |
|---|---|---|---|---|---|
| Position on optical disc | $P_{B-2T} - P_B$ | $P_B - P_{B1}$ | $P_{B1} - P_{B+2T}$ | $P_{B-2T} - P_B$ | $P_B - P_{B+2T}$ |
| Comparison target | Cache data | Recording data | Cache data | Cache data | Recording data |

A description will be given with respect to a case in which a recording interrupt position $P_{B1}$ on the optical disc 13 is identical to or precedes the position $P_{B+2T}$ (Case E in FIG. 7). Reproduced data D2-2TB between the position $P_{B-2T}$ and the position $P_B$ on the optical disc 13 is compared with the cache data D2-2TB stored in the buffer memory 12. Reproduced data D2-BB1 between the position $P_B$ and the position $P_{B1}$ on the optical disc 13 is compared with the recording data D1 sent from the host computer 100. Reproduced data D2-B12T between the position $P_{B1}$ and the position $P_{B+2T}$ on the optical disc 13 is compared with the cache data D2b-B12T stored in the buffer memory 12.

A description will be given with respect to a case in which the recording interrupt position $P_{B1}$ on the optical disc 13 is identical to or succeeds a position $P_{B+2T}$ (Case F in FIG. 7). Reproduced data D2-2TB between the position $P_{B-2T}$ and the position $P_B$ on the optical disc 13 is compared with the cache data D2-2TB stored in the buffer memory 12. Reproduced data D2-B2T between the position $P_B$ and the position $P_{B+2T}$ on the optical disc 13 is compared with the data D1 sent from the host computer 100 to be recorded in the optical disc 13.

In the case where it is judged that the check has not passed in step S28 (No in step S28), the processing section 210 judges whether or not reproduction has failed (step S35). In the case where the reproduction has failed (Yes in step S35), the processing section 210 judges whether or not a reason why the reproduction has failed is that a track has not been successfully traced (step S36). In the case where it is judged that the track has not been successfully traced (No in step S36), the processing section 210 carries out error processing (step 21), and the recording process is terminated.

In the case where the reproduction has not failed in step S35 (No in step S35) or in the case where it is judged that the track has been successfully traced in step S36 (Yes in step S36), the control section 200 causes the disc type detecting section 204 to judge whether or not the optical disc 13 is a data rewritable type (step S37). In the case where the optical disc 13 is a rewritable type (Yes in step S37), the rewriting section 211 carries out recording from the position $P_{B-2T}$ or the position $P_B$ again according to a result of check in step S27, namely, according to at what position the data has not been correctly recorded (step S42). In the case where the optical disc 13 is not a rewritable type, the processing section 210 judges whether or not a replacement process is set to be carried out (step S38).

In the case where the judgment result is negative (No in step S38), the processing section 210 carries out error processing (step S21), and the recording process is terminated.

In step S38, in the case where the judgment result is positive (Yes in step S38), the control section 200 resisters in the replacement process registering section 212 a minimum ECC block including a defect so as to carry out the replacement process as a unit (step S39). Then, the control section 200 stores the data for ±2 track in the buffer memory 12 while the interrupt position $P_{B1}$ is defined as a reference (step S40). In addition, the replacement process registering section 212 restarts the recording from the interrupt position $P_B$ via recording section 202 (step S41). Then, the control section 200 is monitored the recording interrupt and the end of recording (step S31 and step S32). A processing operation carried out after data and replacing data has been recorded is identical to a case in which normal recording has terminated. A duplicate description is omitted here.

As has been described above, before carrying out recording, the cache date D2b before and after a recording start position $P_0$ or an interrupt position $P_B$ is stored in the buffer memory 12. In the case where recording has been terminated or interrupted, the reproduced data D2 reproduction to the optical disc 13 is checked in comparison with the cache data D2b stored in the buffer memory 12 and the recording data D1 sent from the host computer 100. In this manner, it is possible to reliably check whether or not recording data has been correctly recorded or whether or not data has been recorded at a correct position. On the other hand, in the case where it is judged that the recording has failed, a re-recording process or the like can be properly carried out. Further, by utilizing this function, for example, in the case where a user has made a request for canceling recording and returning to an original state, data can be restored on an optical disc.

Here, if an increased amount of data is stored in the buffer memory 12 as the above described cache data, although check capability (reliability) is improved, a time required for check is extended, thus lowering recording performance. Thus, it is preferable that the data stored in the buffer memory 12 as the cache data D2b be equal to or smaller than that for ±2 tracks (a total of data for 4 tracks) with respect to the recording start position $P_0$ or the recording interrupt position $P_B$.

The present invention is not limited to the above described embodiments. At a stage of carrying out the invention, the present invention can be embodied by modifying constituent elements without departing from the spirit of the invention. In addition, a variety of inventions can be formed by using a proper combination of a plurality of constituent elements disclosed in the above described embodiments. For example, some of all the constituent elements disclosed in the embodiments may be eliminated. Further, the constituent elements according to the different embodiments may be properly combined with each other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disc device comprising:
    a recording section configured to record recording information transferred from a host computer in an optical disc;
    a reproducing section configured to reproduce the information recorded in the optical disc;
    a storage section configured to store cache information Po−n to Po+n obtained by reproducing the optical disc between a preceding position Po−n and succeeding position Po+n by the reproducing section while a recording start position Po is defined as a reference when recording of the recording information is started; and
    a processing section configured to compare
        reproduction information obtained by reproducing the optical disc between the preceding position Po−n and the position Po+n again,
        the cache information stored in the storage section, and
        the recording information, and
    then to determine whether recording has been normally performed on the optical disc when recording of the recording information terminates,
    wherein the processing section is configured to determine whether the recording has been normally performed on the optical disc by
        comparing the reproduction information and the cache information between the preceding position Po−n and the recording start position Po,
        comparing the reproduction information and the recording information between the recording start position Po and a recording end position Pe, and
        comparing the reproduction information and the cache information between the recording end position Pe and the succeeding position Po+n,
    when the recording end position Pe is positioned between the recording start position Po and the succeeding position Po+n.

2. The optical disc device according to claim 1, wherein the storage section is configured to store the cache information Po−n to Po+n equal to or smaller than ±2 tracks (±2t) at the recording start position Po.

3. The optical disc device according to claim 1, wherein the recording section is configured to record the recording information in an optical disc from a preceding position Po−n again, when the processing section determines that the information has been successfully read out from the optical disc, the recording information has not been normally written in an optical disc, and the type of the optical disc is a rewritable type.

4. A recording method comprising:
    storing cache information Po−n to Po+n obtained by reproducing an optical disc between a preceding position Po−n and a succeeding position Po+n in a storage section while a recording start position Po is defined as a reference, when recording of recording information is started or recording is restarted after the recording has been interrupted;

recording the recording information in the optical disc;

acquiring reproduction information obtained by reproducing the optical disc between the preceding position Po−n and the succeeding position Po+n when the recording of the recording information is terminated; and determining whether the recording has been normally performed on the optical disc when a recording end position Pe is positioned between the recording start position Po and the succeeding position Po+n, wherein the determining comprises comparing the reproduction information and the cache information between the preceding position Po−n and the recording start position Po, comparing the reproduction information and the recording information between the recording start position Po and the recording end position Pe, and comparing the reproduction information and the cache information between the recording end position Pe and the succeeding position Po+n.

5. An optical disc device comprising:

a recording section configured to record recording information transferred from a host computer in an optical disc;

a reproducing section configured to reproduce the information recorded in the optical disc;

a storage section configured to store cache information Po−n to Po+n obtained by reproducing the optical disc between a preceding position Po−n and succeeding position Po+n by the reproducing section while a recording start position Po is defined as a reference, when recording of the recording information is started; and a processing section configured to compare reproduction information obtained by reproducing the optical disc between the preceding position Po−n and the succeeding position Po+n again, the cache information stored in the storage section, and the recording information, and then, to determine whether recording has been normally performed on the optical disc when recording of the recording information terminates, wherein the processing section is configured to determine whether the recording has been normally performed on the optical disc by comparing the reproduction information and the cache information between the preceding position Po−n and the recording start position Po, and comparing the reproduction information and the recording information between the recording start position Po and succeeding position Po+n, when the recording end position Pe exceeds the succeeding position Po+n.

6. The optical disc device according to claim 5, wherein the storage section is configured to store the cache information Po−n to Po+n equal to or smaller than ±2 tracks (±2t) at the recording start position Po.

7. The optical disc device according to claim 5, wherein the recording section is configured to record the recording information in an optical disc from a preceding position Po−n again, when the processing section determines that the information has been successfully read out from the optical disc, the recording information has not been normally written in an optical disc, and the type of the optical disc is a rewritable type.

8. An optical disc device comprising:

a recording section configured to record recording information transferred from a host computer in an optical disc;

a reproducing section configured to reproduce the information recorded in the optical disc;

a storage section configured to store cache information Po−n to Po+n or Pb−n to Pb+n obtained by reproducing the optical disc between a preceding position Po−n and a succeeding position Po+n or a preceding position Pb−n and a succeeding position Pb+n while a recording start position Po or a recording interrupt position Pb is defined as a reference, when recording of the recording information is started or recording is restarted after the recording has been interrupted; and a processing section configured to compare reproduction information obtained by reproducing the optical disc between the preceding position Pb−n and the succeeding position Pb+n again, the cache information stored in the storage section, and the recording information, and then, to determine whether recording has been normally performed on the optical disc when recording of the recording information is interrupted or recording is interrupted after the recording has been restarted, wherein the processing section is configured to determine whether the recording information has been normally written in the optical disc by comparing the reproduction information and the cache information between the preceding position Po−n and the recording start position Po or the recording interrupt position Pb, comparing the reproduction information and the recording information between the recording start position Po or the recording interrupt position Pb and a first recording interrupt position Pa or a second recording interrupt position Pb1, and comparing the reproduction information and the recording information between the first recording interrupt position Pa or a second recording interrupt position Pb1 and the succeeding position Po+n, when the first recording interrupt position Pa at which a recording of the recording information is interrupted or the second recording interrupt position Pb1 at which a recording of the recording information is restarted is between the recording start position Po or the recording interrupt position Pb and the succeeding position Po+n.

9. The optical disc device according to claim 8, wherein the storage section is configured to store the cache information Po−n to Po+n or Pb−n to Pb+n equal to or smaller than ±2 tracks (±2t) at the recording start position Po or recording interrupt position Pb.

10. The optical disc device according to claim 8, wherein the recording section is configured to record the recording information in an optical disc from the recording interrupt position Pb again, when the processing section determines that the information has been successfully read out from the optical disc, the recording information has not been normally written in an optical disc, and the type of this optical disc is a rewritable type.

11. An optical disc device comprising:

a recording section configured to record recording information transferred from a host computer in an optical disc;

a reproducing section configured to reproduce the information recorded in the optical disc;

a storage section configured store cache information Po−n to Po+n or Pb−n to Pb+n obtained by reproducing the optical disc between a preceding position Po−n and a succeeding position Po+n or a preceding position Pb−n or a succeeding position Pb+n while a recording start position Po or a recording interrupt position Pb is defined as a reference, when recording of the recording information is started or recording is restarted after the recording has been interrupt; and a processing section configured to compare
  reproduction information obtained by reproducing the optical disc between the preceding position Pb−n and the succeeding position Pb+n again,
  the cache information stored in the storage section, and the recording information, and
then, to determine whether recording has been normally performed on the optical disc when recording of the recording information terminates or is interrupted,
wherein the processing section is configured to determine whether the recording information has been normally written in the optical disc by
  comparing the reproduction information and the cache information between the preceding position Po−n and the recording start position Po or a recording interrupt position Pb, and
  comparing the reproduction information and the recording information between the recording start position Po or the recording interrupt position Pb and the succeeding position Po+n,
when a first recording interrupt position Pa at which a recording of the recording information is interrupted or a second recording interrupt position Pb1 at which a recording of the recording information is restarted exceeds the succeeding position Po+n.

12. The optical disc device according to claim 11, wherein the storage section is configured to store the cache information Po−n to Po+n or Pb−n to Pb+n equal to or smaller than ±2 tracks (±2t) at the recording start position Po or recording interrupt position Pb.

13. The optical disc device according to claim 11, wherein the recording section is configured to record the recording information in an optical disc from the preceding position Pb−n or the recording interrupt position Pb again, when the processing section determines that the information has been successfully read out from the optical disc, the recording information has not been normally written in an optical disc, and the type of the optical disc is a rewritable type.

14. A recording method comprising:
storing cache information Po−n to Po+n or Pb−n to Pb+n obtained by reproducing an optical disc between a preceding position Po−n and a succeeding position Po+n or a preceding position Pb−n and a succeeding position Pb+n in a storage section while a recording start position Po or a recording interrupt position Pb is defined as a reference, when recording of recording information is started or recording is restarted after the recording has been interrupted;
acquiring reproduction information obtained by reproducing the optical disc between the preceding position Pb−n and the succeeding position Pb+n when recording of the recording information terminates or is interrupted or recording is interrupted after the recording has been restarted; and
determining whether recording has been normally performed on the optical disc when a first recording interrupt position Pa at which a recording of the recording information is interrupted or a second recording interrupt position Pb1 at which a recording of the recording information is restarted is between the recording start position Po or the recording interrupt position Pb and the succeeding position Po+n,
wherein the determining comprises
comparing the reproduction information and the cache information between the preceding position Po−n and the recording start position Po or the recording interrupt position Pb,
comparing the reproduction information and the recording information between the recording start position Po or the recording interrupt position Pb and the first recording interrupt position Pa or the second recording interrupt position Pb1, and
comparing the reproduction information and the cache information between the first recording interrupt position Pa or second recording interrupt position Pb1 and the succeeding position Po+n.

* * * * *